Aug. 5, 1969     G. A. DOTTO     3,459,981

SHADED POLE SYNCHRONOUS MOTOR

Filed June 1, 1966

INVENTOR
GIANNI A. DOTTO
BY
ATTORNEY

United States Patent Office 3,459,981
Patented Aug. 5, 1969

3,459,981
SHADED POLE SYNCHRONOUS MOTOR
Gianni A. Dotto, Dayton, Ohio, assignor to P. R. Mallory & Co. Inc., Indianapolis, Ind., a corporation of Delaware
Filed June 1, 1966, Ser. No. 554,371
Int. Cl. H02k *21/12, 21/04*
U.S. Cl. 310—156            9 Claims

ABSTRACT OF THE DISCLOSURE

An electric motor is contained in a soft magnetic metal housing. A pair of stator members, having shading rings disposed on each of the members for developing a magnetic flux which lags the main flux induced therein to produce a rotating magnetic field, is disposed within the housing and fastened thereto. There is a field coil for providing an alternating magnetic flux and alternately changing the polarity of the stator members. The rotor of the electric motor is a squirrel cage rotor having a permanent magnet mounted thereon. The magnet means induces the motor to operate at a synchronous speed after it is started as a shaded pole motor.

---

The present invention relates to electric motors and more particularly to the means and methods for providing a shaded pole synchronous motor. The motor of the present invention operates as a typical shaded pole motor when started and continues to operate as a shaded pole motor until it reaches a predetermined speed. At that point, a permanent magnet means mounted on the rotor takes over and the motor continues to run at a synchronous speed as long as the torque load on the output shaft is les than approximately 80% of the total torque capability of the motor. When the torque load on the output shaft exceeds approximately 80% of the total torque capability of the motor, the motor will operate as a typical shaded pole motor.

The motor of the present invention distinguishes over prior art shaded pole motors because of the aforementioned permanent magnet means which induces the motor to operate at synchronous speeds. Conversely, the motor of the present invention distinguishes over prior art synchronous motors because of the shaded pole features provided therein. The motor of the present invention is, therefore, a novel combination of a shaded pole motor and a synchronous motor.

The motor of the present invention was developed to provide relatively high torques at relatively high and constant speeds and to occupy less space than motors providing similar torques at similar speeds. In an illustrative embodiment of the present invention there are a pair of stator members or poles and a pair of permanent magnet rotor poles. Therefore, the motor has a synchronous speed of 3600 r.p.m. In addition, each of the stator members or poles are shaded so as to provide a rotating magnetic field and the rotor is constructed as a typical squirrel cage rotor having a permanent magnet means mounted thereon. Therefore, the motor will operate as a typical shaded pole motor up to approximately 3250 r.p.m.

In the abovementioned illustrative embodiment, the housing is adapted to provide a magnetic flux path closing means for the stator members. Specifically, the housing is fabricated of soft magnetic metal and the stator members are connected to said housing so as to be of the opposite polarity for any given half-cycle input to the field coil.

It is an object of the present invention, therefore, to provide a shaded pole, synchronous motor.

It is another object of the present invention to provide a motor having shaded pole features for starting and permanent magnet means for running at synchronous speeds.

It is yet another object of the present invention to provide a motor having a pair of stator poles with shading rings disposed thereon and a squirrel cake rotor with a pair of permanent magnet poles disposed thereon, said motor being adapted to start as a shaded pole motor and run as a synchronous motor.

It is a further object of the present invention to provide a motor will will operate at synchronous speeds when the torque load on the shaft is less than approximately 80% of the total output torque, capability of the motor.

It is still a further object of the present invention to provide a motor having a typical squirrel cage rotor with a permanent magnet means mounted thereon so as to provide a pair of radially and evenly spaced magnetic poles.

It is another object of the present invention to provide a motor for providing relatively high output torques at relatively high speeds and which will occupy less space than contemporary motors which will provide similar torques at similar speeds.

The present invention, in another of its aspects, relates to novel features of the instrumentalities described herein for teaching the principal object of the invention and to the novel principles employed in the instrumentalities whether or not these features and principles may be used in the said object and/or in the said field.

Other objects of the invention and the nature thereof will become apparent from the following description considered in conjunction with the accompanying drawings and wherein like reference numbers describe elements of similar function therein and wherein the scope of the invention is determined rather from the dependent claims.

For illustrative purposes, the invention will be described in conjunction with the accompanying drawings in which.

Generally speaking, the present invention is an electric motor contained in a soft magnetic metal housing. There are a pair of stator members fastened to said housing. Shading rings are disposed on each of said stator members for developing a magnetic flux which lags the main flux induced therein to thereby produce a rotating magnetic field. There is a field coil for providing an alternating magnetic flux and alternately changing the polarity of said stator members. The rotor of the electric motor of the present invention is a typical squirrel cake rotor having a permanent magnet means mounted thereon. The permanent magnet means induces the motor to operate at a synchronous speed after it is started as a typical shaded pole motor.

Figure 1:
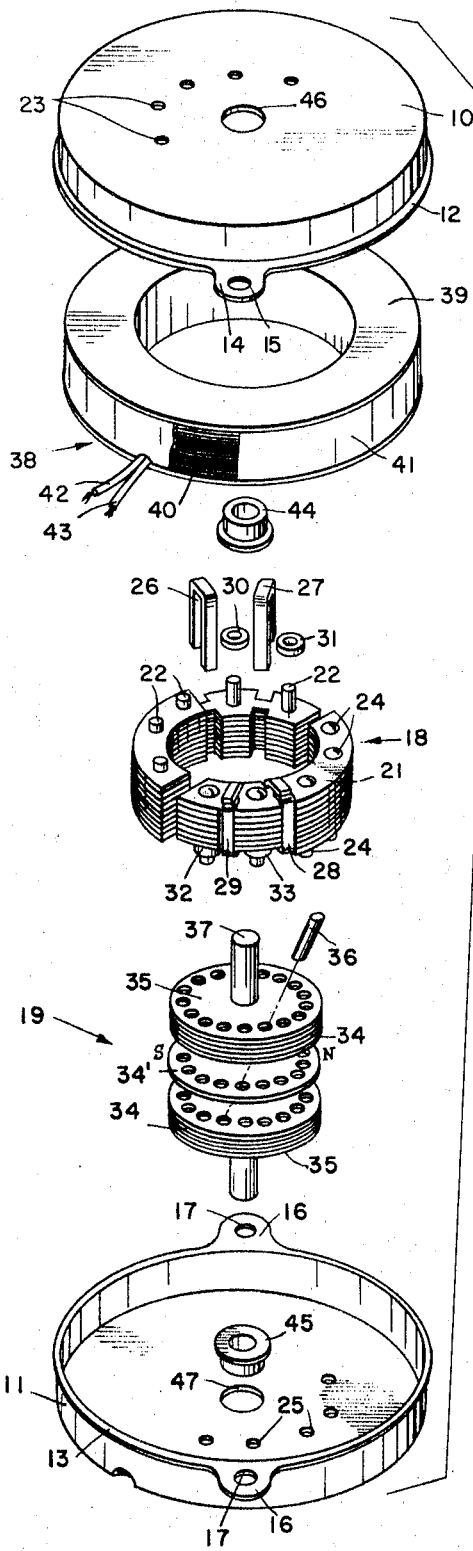
FIGURE 1 is an exploded perspective view of the motor of the present invention.

Referring now to the drawing, and particularly to the exploded perspective view of FIGURE 1, the component parts and structure of the present invention can be visualized in conjunction with the following description.

The housing for the motor of the present invention consists of top cover 10 and bottom cover 11. Both the top cover 10 and bottom cover 11 are cylindrically shaped and have a substantially flat end and an open end. There is a flange 12 around the open end of the top cover 10 and a flange 13 around the open end of the bottom cover. There are two mounting ears 14 with mounting holes 15 on the top cover and two mounting ears 16 with mounting holes 17 in the bottom cover 11. When the top cover 10 and bottom cover 11 are held together to form an enclosure, both the top cover 10 and bottom cover 11 serve as a magnetic flux path closing means as well as a support for a stator 18 and rotor 19. Usually, the top cover 10 and bottom cover 11 will be fabricated of annealed cold rolled steel.

The stator 18 consists of a pair of arcuately shaped laminated metallic stator members 20 and 21. Together, the stator members 20 and 21 form a circular ring having a predetermined outer diameter and inner diameter and two gaps separating the two stator members of the ring. The stator member 20 has a plurality of rivets 22 for holding the laminations together and for holding the stator member 20 to the top cover 10. The top cover 10 is provided with a plurality of arcuately spaced holes 23 for receiving the rivets 22. The stator member 21 has a plurality of rivets 24 for holding the laminations together and for holding the stator member 21 to the bottom cover 11. There are a plurality of arcuately spaced holes 25 for receiving the rivets 24.

In the illustrative embodiment of this specification, the stator member 20 has a pair of shading rings 26 and 27 disposed thereon and the stator member 21 has a pair of shading rings 28 and 29 disposed thereon. It can be seen that the stator member 20 has less laminations at the point where the shading rings 26 and 27 are located so as to provide clearance between the shading rings 26 and 27 and the top cover 10. In a similar manner and for the same reason, the stator member 21 has less laminations where the shading rings 27 and 28 are located. For illustrative purposes, the shading rings 26 and 27 are shown in FIGURE 1. When the motor is completed, the shading rings 26 and 27 will be closed and either soldered or welded like the shading rings 28 and 29. The shading rings 26, 27, 28 and 29 may be made of any suitable conducting material such as copper. There are a pair of copper spacers 30 and 31 disposed between the reduced portion of the stator member 20 and the top cover 10. There are also a pair of copper spacers 32 and 33 disposed on the rivets 24 between the reduced portion of the stator member 21 and the bottom cover 11.

The rotor 19 consists of a plurality of magnetic metal rings 34 sandwiched between a pair of copper rings 35 and mounted on a shaft 37. The metal rings 34 and copper rings 35 are riveted together by a plurality of copper pins 36 so as to form a typical squirrel cage motor. It can be seen that all of the rings 34 and 35 are slightly offset so that the pins 36 are on an angle with the shaft 37. In the illustrative embodiment, a ring 34' is made of a suitable permanent magnet material and is magnetized so as to have alternately spaced north and south magnetic poles. With the ring 34', the motor of the present invention will operate as a synchronous motor. Without the permanently magnetized ring 34', the motor of the present invention will operate as a typical shaded pole motor.

There is a spool wound field coil 38 consisting of an insulative spool 39, a predetermined number of turns of insulated wire 40 wrapped around the spool 39, insulating tape 41 wrapped around the wire 40 and lead wires 42 and 43. When the motor is assembled, the field coil 38 is annularly disposed in the space between the stator 18 and the outside walls of the housing.

The rotor 19 shaft 37 is rotatably supported in a pair of bearings 44 and 45. The bearing 44 is mounted in a centrally located hole 46 in the top cover 10 and the bearing 45 is mounted in a centrally located hole 47 in the bottom cover 11.

Figure 2:
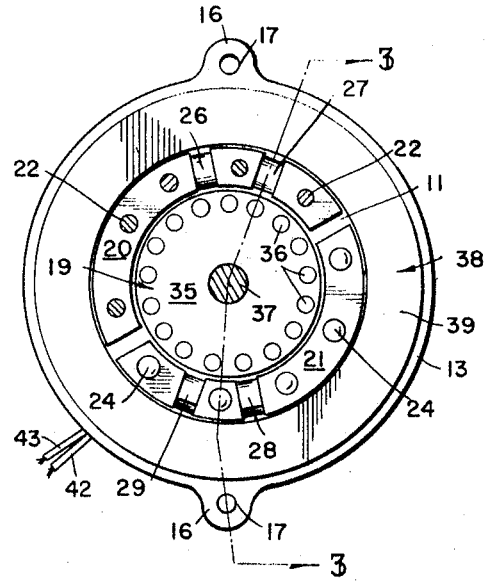
FIGURE 2 is a top view of the motor of the present invention with the top cover removed.

The components of the motor of the present invention are shown assembled in FIGURES 1 and 2.

In FIGURE 2, it can be seen that the rotor 19 is concentrically disposed in the ring formed by the stator members 20 and 21. There is a uniform air gap separating the rotor 19 and the stator members 20 and 21. The field coil 38 is concentrically disposed about the stator members 20 and 21.

Figure 3:
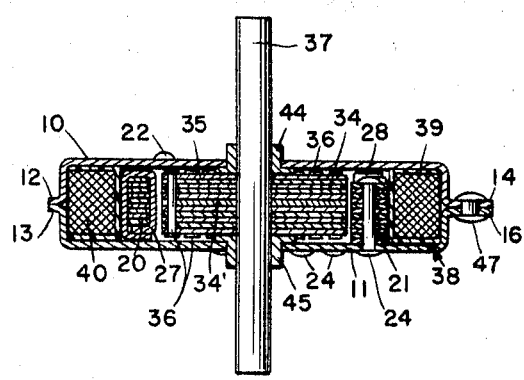
FIGURE 3 is a sectional view 3—3 taken from FIGURE 2.

In FIGURE 3, it can be seen that the top cover 10 and bottom cover 11 are held together by rivets 47 disposed in the mounting holes in the mounting ears 14 and 16.

It has been found that the motor of the present invention operates at a predetermined synchronous speed as long as the torque load on the output shaft 37 is less than approximately 80% of the total output torque capability of the motor and there is a permanent magnet means mounted on the rotor 19 as discussed previously. If the torque load exceeds approximately 80% of the total output torque capability of the motor, the motor will operate as a typical shaded pole motor.

The initial torque output and motion of the rotor 19 is supplied by the shaded pole effect. The rotor is held at synchronous speeds by the permanent magnet means mounted on the rotor 19 in a manner well known in the synchronous motor art. Specifically, in the synchronous mode, the rotor 19 has salient magnetic poles which are alternately attracted and repulsed by the magnetic field induced in the stator members 20 and 21.

As an illustrative example of the present invention a motor has been constructed in accordance with the description in this specification. The details of the constructed motor and the results obtained are provided in the following paragraphs.

The constructed motor was approximately 2″ in diameter and ½″ thick. The stator members 20 and 21 enclosed an arc of approximately 170° each. The shading ring 27 was placed approximately 35° from the end of the stator member 20 and the shading ring 26 was placed approximately 35° from the shading ring 27. The shading ring 29 was placed approximately 35° from the end of the stator member 21 and the shading ring 28 was placed approximately 35° from the shading ring 29.

The rotor 19 was formed with seventeen copper pins 36 offset with respect to the shaft 37 at an angle of 30°. The ring 34' was fabricated of Alnico 5, a permanent magnet material. Once the rotor 19 was assembled, the ring 34' was permanently magnetized to provide a pair of permanent magnet salient poles on the outer periphery thereof.

The field coil 38 was fabricated by winding 1575 turns of #38 AWG insulated wire on the spool 39. The motor, constructed as described above, was connected to a 115 volt, 60 cycles per second power source and tested. The test results show that the initial torque and motion of the rotor was supplied by the shaded pole lamination effect up to a speed of approximately 3250 r.p.m. and then the permanent magnet means mounted on the rotor 19 took over to increase the speed to a synchronous speed of 3600 r.p.m. The synchronous speed of 3600 r.p.m. was maintained as long as the torque load on the shaft 37 was approximately 80% of the total torque output capability of the motor. The total output torque capability of the motor just described was approximately 1.2 in.-oz. The output at a synchronous speed of 3600 r.p.m. was approximately 1.0 in.-oz.

The motor of the present invention, as hereinbefore described, is merely illustrative and not exhaustive in scope. Since many widely different embodiments of the invention may be made without departing from the scope thereof, it is intended that all matter contained in the above description and shown in the accompanying drawing shall be interposed as illustrative and not in a limiting sense.

What is claimed is:

1. An electric motor comprising: a soft magnetic metal substantially cylindrically shaped housing having substantially flat ends; a pair of arcuately shaped stator members forming an arc of less than 180° fastened to the inside surface of each of said ends of said housing, each of said stator members having shading rings disposed thereon for developing a magnetic flux which lags the main magnetic flux induced therein to thereby produce a rotating magnetic field, non-magnetic spacer means disposed between said stator members and said housing, a field coil for providing an alternating magnetic flux and alternately changing the polarity of said stator members, said field coil disposed within said housing about said stator members; and a rotor rotatably supported in said housing between said pair of stator members, said rotor comprising a plurality of soft magnetic metal rings mounted on a shaft and sandwiched between a pair of non-magnetic rings, a plurality of evenly spaced non-magnetic rivets extending through said soft magnetic metal rings, and non-magnetic rings, thereby interconnecting said non-magnetic rings, and permanent magnet means mounted on said shaft so as to provide a pair of evenly and radially spaced permanent magnet poles.

2. An electric motor as in claim 1 wherein said stator members are composed of soft magnetic metal laminations riveted to said housing.

3. An electric motor as in claim 1 where said stator members are composed of arcuately shaped soft magnetic metal laminations riveted to said housing so as to form a circular opening therebetween.

4. An electric motor as in claim 1 wherein said permanent magnet means is a permanently magnetized magnetic metal ring sandwiched between a pair of said soft magnetic metal rings.

5. An electric motor as in claim 1 wherein said field coil is a spool wound coil.

6. An electric motor as in claim 1 wherein said stator members are arcuately shaped members forming an arc of less than 180 degrees and there are a pair of shading rings disposed on each stator member.

7. An electric motor as in claim 1 wherein said non-magnetic rivets extending through said soft magnetic metal rings and non-magnetic rings are offset at a predetermined angle with respect to said shaft.

8. An electric motor according to claim 1, wherein said non-magnetic rings are copper.

9. An electric motor according to claim 1, wherein said non-magnetic rivets are copper.

References Cited

UNITED STATES PATENTS

| | | | |
|---|---|---|---|
| 2,234,420 | 3/1941 | Traeger | 310—164 |
| 2,442,626 | 6/1948 | Tolson et al. | 310—163 |
| 3,210,584 | 10/1965 | Jorgensen et al. | 310—162 XR |
| 2,981,855 | 4/1961 | VanLieshout et al. | 310—156 XR |
| 2,131,436 | 9/1938 | Howell | 310—156 |
| 2,815,459 | 12/1957 | Fleckenstein | 310—172 |
| 2,149,569 | 3/1939 | Barrett | 310—172 |

MILTON O. HIRSHFIELD, Primary Examiner

B. A. REYNOLDS, Assistant Examiner

U.S. Cl. X.R.

310—164, 172, 254, 265